United States Patent [19]

Nau

[11] 4,178,894
[45] Dec. 18, 1979

[54] NONPOLLUTING LIQUID FUEL SYSTEM FOR ENGINES

[75] Inventor: Paul R. Nau, Wauwatosa, Wis.

[73] Assignee: Briggs & Stratton Corporation, Wauwatosa, Wis.

[21] Appl. No.: 887,476

[22] Filed: Mar. 17, 1978

[51] Int. Cl.[2] ................................. F02M 25/06
[52] U.S. Cl. ................................. 123/119 B; 123/136
[58] Field of Search ......................... 123/136, 119 B

[56] References Cited

U.S. PATENT DOCUMENTS

| | | | |
|---|---|---|---|
| 3,172,348 | 3/1965 | Berg | 123/136 X |
| 3,511,218 | 5/1970 | Lazaros | 123/136 |
| 3,517,654 | 6/1970 | Sarto et al. | 123/136 |
| 3,673,997 | 7/1972 | Sawada | 123/136 |
| 3,675,634 | 7/1972 | Tatsutomi et al. | 123/136 |
| 3,695,376 | 10/1972 | Fiedler et al. | 123/136 |
| 3,731,665 | 5/1973 | Garcea | 123/136 |
| 3,779,224 | 12/1973 | Tagawa et al. | 123/136 |
| 3,884,204 | 5/1975 | Krautwurst et al. | 123/136 |
| 4,000,727 | 1/1977 | Walker | 123/136 |

*Primary Examiner*—Wendell E. Burns
*Attorney, Agent, or Firm*—Ira Milton Jones

[57] ABSTRACT

Inside the fuel tank of a small engine liquid fuel system is a buffer chamber that has its interior communicated with the rest of the tank interior only through a small upper air vent and a restricted bottom fuel port. During fueling, fuel enters the buffer chamber slowly and continues to enter it after the tank is apparently full, lowering the fuel level sufficiently to prevent seepage through the tank cap. The engine crankcase is vented to the carburetor air induction passage through a breather check valve in the carburetor body. A first valve, responsive to pressure differences between the atmosphere and the tank interior, vents overpressures in the tank to the crankcase. A second valve, responsive to the difference between tank pressure and subatmospheric cranckcase pressure, admits air to the tank when the engine is running.

9 Claims, 4 Drawing Figures

NONPOLLUTING LIQUID FUEL SYSTEM FOR ENGINES

This invention relates to liquid fuel systems for internal combustion engines, especially small engines such as are used for powering lawn mowers, small tractors and the like; and the invention is more particularly concerned with an engine fuel system from which no more than negligible quantities of unburned fuel vapors are emitted into the atmosphere.

In a liquid fuel system for a small engine, fuel is usually drawn from a fuel tank by suction—which is to say that atmospheric pressure, acting upon the fuel in the tank, is relied upon to force the fuel towards a zone of subatmospheric pressure in a carburetor or the like. To maintain a desired rate of fuel flow, pressure in the interior of the tank must be maintained substantially equal to the pressure of the ambient atmosphere; hence air must be permitted to flow into the tank as fuel is withdrawn from it, and air must also be permitted to flow out of the tank as fuel in the tank expands due to heating.

Heretofore, the necessary venting of a fuel tank has usually been provided for by means of a small breather hole at a high location in the tank, commonly in the cap or cover for the filler opening. Because of the volatility of gasoline, the fuel most commonly used for small engines, the air vented out of the breather hole inevitably carried fumes and vapors that gave rise to the danger of fire and explosion, were hazardous to health in high concentrations, and had an objectionable odor.

The problem of preventing emission of unburned fuel vapors from an engine fuel tank does not lend itself to easy solution. If the tank vent were to be provided with a check valve or the like that would permit air to flow into the tank but not out of it, above-atmospheric pressures could build up in the tank that could affect carburetion in a manner to result in poor starting and running performance, and vapor concentrations would tend to develop in the tank that might create greater hazards than those due to the slow, steady vapor venting provided for by the conventional breather hole.

One general object of the present invention is to provide an engine fuel system comprising a tank for gasoline or similar liquid fuel, which system has means for preventing unburned fuel vapors from being expelled into the atmosphere at times when pressure in the tank is increasing, but by which the tank is nevertheless vented to maintain a constant substantially atmospheric pressure therein notwithstanding either expansion or contraction of the volume of fuel in the tank.

More broadly, therefore, it is an object of this invention to achieve a very substantial reduction in the quantity of unburned fuel vapors emitted by an internal combustion engine liquid fuel system, thereby substantially avoiding pollution of the air with such vapors.

A comprehensive view of small engine fuel systems as sources of unburned fuel vapors must take account of the fact that fuel tank "breathing" may be a relatively minor cause of such air pollution, as compared to fuel seepage past the tank filler cap, occurring under conditions that developed rather frequently and easily with prior fuel systems. If a tank is filled to the top with cold gasoline, and the temperature of the gasoline is thereafter substantially raised before any significant amount of it is withdrawn from the tank, its expansion forces the gasoline past the filler cap. Even if the gasoline is not heated, engine vibration or abrupt bodily movements can cause the fuel in a full tank to slosh and thus be forced out past the cap. Such sloshing is particularly likely to occur in conventional small engine fuel tanks, which are shallow vertically in relation to their horizontal dimensions.

It should be noted that liquid gasoline has a substantially lower viscosity than water, and therefore it can seep through tiny crevices between the filler cap and the neck of the filler opening unless the cap is very tightly sealed to the filler neck. Ordinarily, the cap is not installed in a manner to prevent such seepage. If the filler cap has a breather vent of the heretofore conventional type, that hole naturally presents an easy exit for overflowing fuel.

Anyone filling a fuel tank tends to fill it all the way to the top, mainly because it is difficult to judge the level of fuel in a tank until it reaches the filler neck. At that level the tank is effectively overfilled, in the sense that the predisposing condition for fuel seepage is present.

Thus, in furtherance of the general objective of substantially minimizing or preventing emission of unburned fuel vapors from engine fuel systems, it is a more specific object of this invention to provide means in an engine fuel tank whereby overfilling of the tank is effectively prevented without imposing any inconvenience upon a person filling the tank or requiring that any unusual fueling procedure be followed, and whereby, in addition, sloshing of fuel in the tank tends to be minimized.

It is also a specific object of this invention to provide an engine fuel system wherein there is no breather hole in the tank cap, so that fuel seepage out of the tank is minimized even under conditions that produce extreme fuel sloshing, and wherein means are nevertheless provided for venting the tank to maintain substantially atmospheric pressure in its interior while preventing unburned fuel vapors from being emitted into the atmosphere.

In further connection with the general object of providing an engine fuel system from which substantially no unburned fuel vapors can escape into the atmosphere, it is a specific object of this invention to provide such a fuel system which is particularly suitable for small engines, and which can therefore comprise a carburetor body overlying the top of a fuel tank and a resilient membrane confined between the carburetor body and the fuel tank to serve as a gasket between them, wherein the membrane, which may have portions that serve as the diaphragm and flapper valves of a fuel pump actuated by suction in the engine induction system, can also have portions that function to prevent vapor emissions from the fuel system in accordance with the principles of this invention.

In futher connection with the last-stated object, it is also an object of the invention to provide an engine fuel system which prevents emission of unburned fuel vapors into the atmosphere and which meets the stringent requirements for very low cost, extreme compactness and sturdy reliability that are imperatives in small engine equipment.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
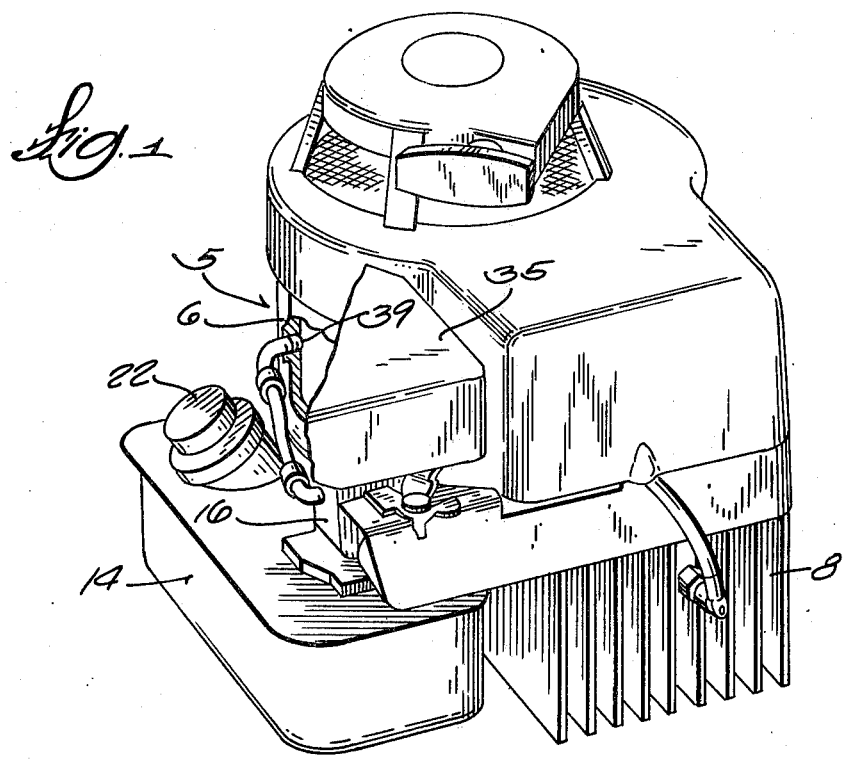
FIG. 1 is a perspective view of an engine having a fuel system embodying the principles of this invention, with portions shown broken away.
Figure 2:
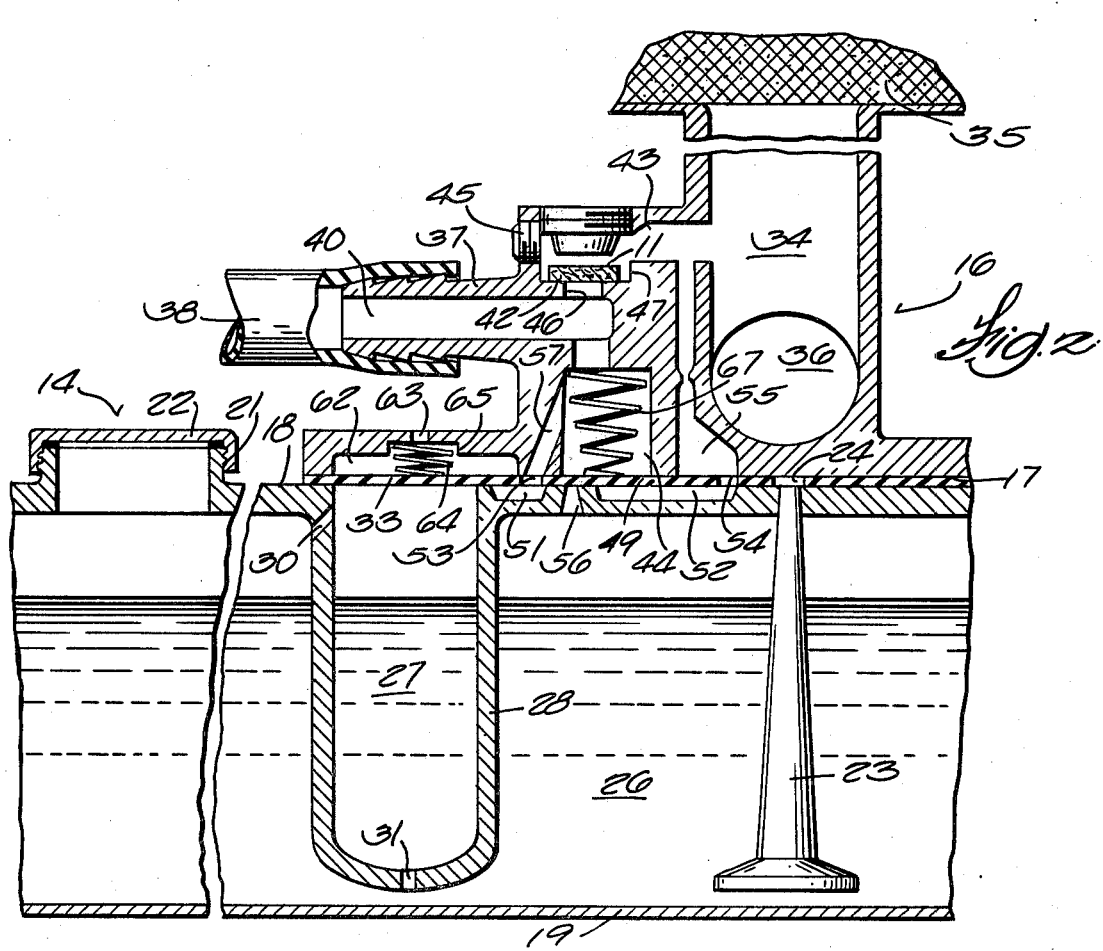
FIG. 2 is a view in vertical section through a portion of the fuel tank and of the carburetor body in the fuel system of the engine shown in FIG. 1, with the apparatus in a condition in which no venting of the fuel tank is occuring.
Figure 3:
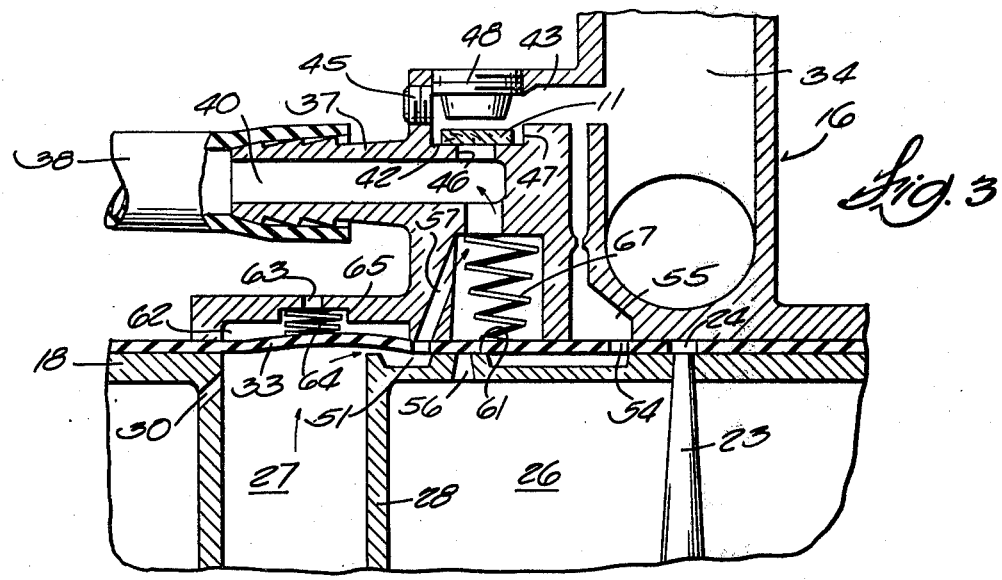
FIG. 3 is a view generally similar to FIG. 2 but showing the apparatus in its condition for relieving above-atmospheric pressure in the fuel tank.
Figure 4:
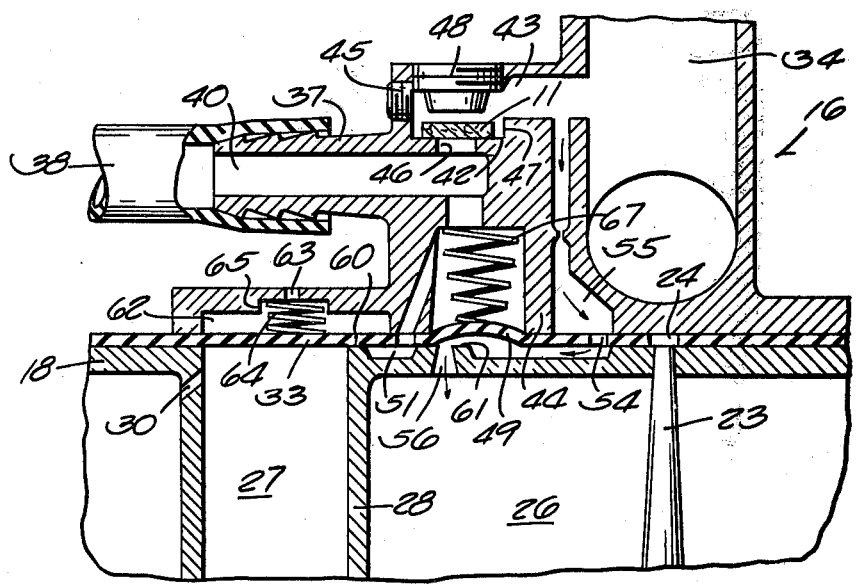
FIG. 4 is a view generally similar to FIG. 2 but showing the apparatus in its condition for relieving subatmospheric pressure in the fuel tank.

Referring now more particularly to the accompanying drawings, the numeral 5 designates generally the body of a small four-cycle internal combustion engine, comprising a crankcase 6 that serves as a reservoir for a supply of oil by which the moving internal parts of the engine are lubricated. During the course of an engine cycle, as a piston (not shown) reciprocates in a cylinder 8 that opens to the crankcase, pressure in the crankcase tends to fluctuate constantly and rather widely between above-atmospheric and below-atmospheric values. However, above-atmospheric pressures are relieved through a check valve 11 which has a novel location in the apparatus of the present invention, as described hereinafter, but which functions to control crankcase breathing in the same manner as the heretofore conventional check valve that was located on a side wall of the crankcase, near the top thereof. Thus the check valve 11 opens in response to above-atmospheric pressures in the crankcase but otherwise remains closed, so that the average pressure in the crankcase interior, taken through the full engine cycle, is below-atmospheric. The conventional purpose for maintaining this slight net vacuum in the crankcase is to prevent oil from seeping out of it through the crankshaft bearings (not shown), but as the description proceeds it will become apparent that the present invention has a further and novel employment for this crankcase vacuum.

Turning now to the novel fuel system of this invention, it comprises a fuel tank 14 that holds a supply of liquid fuel for the engine and a carburetor 16 that comprises the usual means for metering and atomizing fuel and mixing it with combustion air for the engine so that the fuel can be readily ignited in the engine cylinder 8. For clarity, the conventional fuel passages and jets in the carburetor are not shown, and only those portions of the carburetor body that have a direct relationship to the invention are illustrated.

As illustrated, the carburetor 16 overlies the fuel tank 14 in an arrangement that is generally conventional for small engines, with a resilient membrane 17 confined between a generally flat top wall 18 of the fuel tank and a flat undersurface on the carburetor body to serve as a gasket between them. It will be understood that, if desired, portions of the membrane 17 could comprise the diaphragm and flapper valves of a more or less conventional fuel pump actuated by engine suction, for lifting fuel from the tank to a cup or reservoir (not shown) in the carburetor body, but details of the fuel pump are not illustrated, since the present invention is not dependent upon the inclusion of such a pump in the fuel system. Whether or not it provides elements of a fuel pump, the membrane 17 can provide the diaphragms of certain pressure responsive valves, as described hereinafter, although such valves could obviously be constituted quite differently than as here illustrated, their incorporation into the membrane 17 being a convenient expedient that makes for simple and inexpensive adaptation of conventional small engine structure for the purposes of this invention.

In addition to its generally flap top wall 18, the fuel tank 14 has a substantially flat bottom wall 19 and a side wall 20 that is sealed to its top and bottom walls. As is more or less conventional with small engines, the illustrated tank is relatively shallow vertically, in that the distance between its top and bottom walls is substantially smaller than its length and width dimensions. Near one end thereof the top wall has an upwardly necked filler opening 21 that is threaded or otherwise formed to accommodate a readily removable closure or tank cap 22. In accordance with the principles of this invention, the cap 22 is imperforate and, when in place, cooperates with the filler neck 21 to form a substantially vapor-proof seal around the opening therein.

Fuel is drawn up from the tank 14 into the carburetor body 16 through a generally conventional pickup tube 23 that is spaced from the filler opening 21. The pickup tube projects down from the underside of the carburetor body through a hole in the top wall 18 of the tank and a registering hole 24 in the membrane 17. The portions of the membrane marginal to its hole 24, in being snugly confined between opposing surfaces on the carburetor and the tank, provide a vapor-proof seal around the tube 23.

To prevent overfilling of the tank, its interior is divided into two compartments 26 and 27 that are separated from one another by partition means 28 extending downwardly from the top wall 18 of the tank through at least a major part of the distance to its bottom wall. The compartment 27, which constitutes a buffer chamber, is substantially smaller than the compartment 26, into which the filler neck 21 opens and in which the pickup tube 23 is located. The partition means 28 is imperforate except for a small vent 30 at its top and restricted port means 31 near its bottom through which fuel enters the smaller compartment 27 much more slowly than it can be poured into the larger compartment 26 through the filler opening. A person filling the tank will of course stop pouring fuel into it upon seeing that the larger compartment 26 is filled; but as fuel thereafter continues to flow into the smaller buffer chamber 27, the fuel level in the larger compartment is lowered sufficiently to prevent fuel from being sloshed up past the closure 22 on the filler neck. The partition means 28 also serves as a baffle in the interior of the tank that tends to reduce the severtiy of fuel sloshing.

The small vent 30 provides for equalization of pressure between the two compartments 26 and 27 so that once equilibrium is attained, fuel will remain at the same level in the buffer chamber 27 as in the rest of the tank interior.

The top wall 18 of the tank is preferably die cast, so that it can be readily produced with certain passages in it, as described hereinafter; and the partition means 28 can comprise an integral cup-shaped portion of the die casting, defining a deep well or depression that provides the buffer chamber 27. A portion 33 of the membrane 17 extends across the top of that well to sealingly close the same and also to serve as a diaphragm for a pressure responsive valve that is described below. The diaphragm portion 33 of the membrane further serves as a bottom closure for a pressure chamber 62 that is defined by a well or recess in the underside of the carburetor body, over the buffer chamber 27.

The carburetor body 16 has a large diameter air induction passage 34 through which combustion air is drawn into the engine. Air enters the passage 34 through an air filter 35 that can be mounted on top of the carburetor body, and the flow of air through the passage 34 is metered by a throttle butterfly 36 that is located some distance downstream from the air filter, at a zone in which atomized fuel is mixed with the air. It is now generally conventional in small four-cycle engines to vent the interior of the crankcase to the air induction passage, so that blow-by gases which force their way past the piston from the combustion chamber and vapors from the heated crankcase oil are cycled through the engine combustion chamber along with combustion air, to have their combustible components converted to less objectionable emissions. The fuel system of the present invention also provides for such venting of the crankcase 6 to the air induction passage 34. To that end, the carburetor body has a tubular nipple or hose fitting 37 to which one end of a hose or similar duct 38 is secured, the other end of the hose being connected to the crankcase at a breather port 39. A passage 40 in the carburetor body opens through the nipple 37 at its outer end and has its inner end communicable through a check valve seat 42 with another passage 43 that opens to the air induction passage 34. The inner end of the passage 40 is also in open communication with a suction chamber 44 defined by a downwardly opening well in the carburetor body.

As shown, the passage 43 extends parallel to the passage 40 and is above the same. The passage 43 is bored or cored in the carburetor body from the side thereof towards which the nipple 37 projects, to intersect the air induction passage 34 a short distance downstream from the air filter 35. A small plug 45 closes the outer end of the bore that defines the passage 43. The check valve seat 42, which cooperates with the check valve 11, can be a circumferential shoulder around a small bore 46 that opens downwardly into the passage 40, defined by a counterbore 47 that opens upwardly to the passage 43. The check valve member 11 that cooperates with the upwardly facing seat 42 can be a disc of fibre or the like that is small enough to fit loosely in the counterbore 47 but large enough to cover the bore 46. A plug 48 in the carburetor body, closing the hole that was formed by the boring of the check valve seat, has its flat bottom surface spaced a small distance above the opposing upper face of the check valve disc 11 to limit upward movement of the check valve disc and thus confine it in the counterbore 47. The check valve disc 11 is gravity biased to its closed position and of course opens only when crankcase pressure, acting on its underside, exceeds the pressure acting on its upper surface, the latter pressure being substantially atmospheric pressure as manifested in the air induction passage 34.

The downwardly opening well in the carburetor that defines the suction chamber 44 is sealingly closed at its bottom by a portion 49 of the membrane 17 that serves as the diaphragm of a second pressure responsive valve. It will be recalled that the diaphragm 33 of the first pressure responsive valve comprises the portion of the membrane 17 that separates the buffer chamber 27 from the pressure chamber 62 above it.

These pressure responsive valves, which are described hereinafter, control communication between the interior of the tank 14 and passages that are defined by other portions of the membrane 17 in cooperation with a pair of grooves 51 and 52 in the upper surface of the fuel tank top wall 18. One end of the groove 51 is spaced a small distance from the interior of the buffer chamber 27, and that groove extends away from the buffer chamber to have its other end open to a small hole 53 in the membrane that is spaced a little to one side of the suction chamber 44. Through the hole 53 the groove 51 is communicated with the lower end of a small passage 57 that is drilled obliquely upwardly in the carburetor body from the underside thereof and opens at its upper end to the suction chamber 44. The other groove 52 extends from beneath the diaphragm 49 to another small hole 54 in the membrane, located some distance from the diaphragm 49. Opening from the hole 54 in the diaphragm is a vent passage 55 that is drilled upwardly from the bottom surface of the carburetor body to intersect the passage 43 near its junction with the air induction passage 34. The end of the groove 52 that is under the diaphragm 49 is spaced a small distance from a vent hole 56 that extends through the top wall 18, directly under the diaphragm 49 and the suction chamber.

The portion 60 of the upper surface of the tank top wall 18 that extends between the buffer chamber 27 and its adjacent end of the groove 51 is flat and coplanar with the rest of the upper surface of the top wall; hence when the diaphragm 33 is flat and unflexed, it overlies this surface portion, sealing off the buffer chamber 27 from the groove 51. However, the recess in the underside of the carburetor body that defines the pressure chamber 62 extends laterally beyond the buffer chamber and over a portion of the groove 51, so that the diaphragm 33 can flex up away from the surface portion 60 to provide for communication over that surface portion between the buffer chamber and the groove 51. Thus the diaphragm 33 comprises a pressure responsive valve element, and the surface portion 60 functions as its seat and cooperates with it to provide a pressure responsive valve that controls communication between the interior of the tank and the interior of the crankcase by way of the groove 51 and the suction chamber 44.

In like manner, the portion 61 of the top wall upper surface that is between the vent hole 56 and its adjacent end of the groove 52 is flat and coplanar with the rest of the top wall upper surface, and it cooperates with the diaphragm 49 to provide a pressure responsive valve that controls communication between the interior of the tank and the air induction passage 34 by way of the groove 52.

The pressure responsive valve that comprises the diaphragm 33 opens when pressure in the interior of the fuel tank exceeds atmospheric pressure. The underside of the diaphragm 33 is subjected to pressure in the baffle chamber 27, which is the same as the pressure in the rest of the tank interior, owing to the vent 30 in the partition means 28. The upper surface of the diaphragm 33 is subjected to atmospheric pressure by reason of a small bore 63 in the carburetor body that vents the pressure chamber 62 to the atmosphere. The force that atmospheric pressure exerts upon the upper surface of the diaphragm 33 is supplemented by that of a light compression spring 64, reacting between the carburetor body and the diaphragm. The upper end portion of the spring 64 can be seated in a counterbore 65 in the top of the pressure chamber, concentric with the vent bore 63.

Because the vent hole 56 in the tank top wall is located directly under the suction chamber 44 in the carburetor body, the diaphragm 49 that closes the bottom of the suction chamber has its bottom surface subjected to the pressure prevailing in the interior of the tank and its top surface subjected to the pressure prevailing in the suction chamber 44. In addition, the diaphragm 49 is subjected to a downward biasing force exerted upon its top surface by a coiled compression spring 67 that reacts against the top wall of the suction chamber. Hence the diaphragm 49 allows communication between the tank interior and the groove 52, across the valve seat surface 61, only at times when pressure in the suction chamber 44 is substantially lower than pressure in the interior of the tank. Inasmuch as the suction chamber 44 is at all times communicated with the interior of the crankcase 6, this is to say that the pressure responsive valve comprising the diaphragm 49 is open only at times when the engine is running and a substantial vacuum prevails in the crankcase. The spring 67 that bears downwardly upon the diaphragm 49 is preferably somewhat stiffer than the spring 64 that biases the diaphragm 33, to ensure that the diaphragm 49 will not rise in response to above-atomspheric pressures in the fuel tank that develop at times when the engine is not running; or, as shown, the area of the diaphragm 49 can be made somewhat smaller than that of diaphragm 33, and the vent hole 56 can be located substantially off center relative to diaphragm 49.

It will now be apparent that whenever the pressure in the interior of the fuel tank exceeds atmospheric pressure—whether or not the engine is running—the diaphragm 33 over the buffer chamber 27 will be flexed upwardly in response to that pressure difference, thus opening the pressure responsive valve which comprises that diaphragm and its cooperating seat portion 60 of the top wall upper surface. With that valve open, air and fuel vapor can flow into the groove 51 and thence—by way of the oblique passage 57, the suction chamber 44 and the passage 40—towards the interior of the engine crankcase.

If the engine is running at a time when such excess pressure develops in the fuel tank, the air and fuel vapors vented from the tank may be positively drawn towards or into the crankcase by crankcase vacuum, but almost immediately thereafter, as the piston descends in a subsequent part of the engine cycle, rising pressure in the crankcase will force the vented vapors through the check valve 11 and into the air induction passage 34, to be cycled through the engine for combustion.

When the engine is not running, the conditions that occasion venting of an above-atmospheric pressure from the tank will usually develop after the engine has been stopped for some time and after the interior of the crankcase has attained substantially atmospheric pressurre due to slow leakage of air through the crankshaft bearings. Under these conditions the suction chamber 44, the passage 40, the hose 38 and the interior of the crankcase 6 will constitute an expansion chamber of substantial volume into which the excess pressure in the tank can be relieved and in which a pressure slightly above atmospheric can be maintained by the check valve 11. There may be some very slight leakage of vented fuel vapors out of this expansion chamber through the crankshaft bearings 12, but obviously the greater part of such vapors will be retained until the engine is started, at which time they will be cycled through the combustion chamber by the process described above.

Such small emission of unburned fuel vapor as may take place through the crankshaft bearings 12 when the engine is not running will of course be negligible by comparison with the emissions that would occur through a heretofore conventional tank breather hole under the same circumstances. Furthermore, it is probable that the greatest potential for unburned fuel vapor emissions develops during a period shortly after the engine has been started, when the engine has warmed up sufficiently to transfer heat to fuel in the tank and cause expansion and vaporization thereof at rates which more than offset the withdrawal of fuel from the tank. Since the engine is running when such conditions occur, all unburned fuel vapors then vented from the tank are passed to the combustion chamber as explained above.

It is to be observed that the pressure responsive valve comprising the diaphragm 33 responds to the difference between tank pressure and atmospheric pressure, but vents the tank to the interior of the crankcase; whereas the pressure responsive valve that comprises the diaphragm 49 responds to the difference between tank pressure and crankcase pressure but, when open, vents the tank to the atmosphere.

As pointed out above, the valve comprising the diaphragm 49 is open only when the engine is running, which is the only time that air flow into the tank is needed. However, that valve tends to be open during every engine cycle when the engine is running, irrespective of whether pressure in tank is above-atmospheric or below-atmospheric, and therefore any above-atmospheric pressure that might develop in the tank during engine operation will be relieved through the valve comprising the diaphragm 49 as well as through the valve comprising the diaphragm 33. But owing to the fact that the valve comprising the diaphragm 49 vents the tank to the air induction passage 34, rather than directly to the atmosphere, such fumes as pass out of the tank through it will be cycled through the combustion chamber.

It will be evident that air drawn into the tank will have passed through the air filter 35 and will therefore be free from dust.

From the foregoing description taken with the accompanying drawings it will be apparent that this invention provides a liquid fuel system which is particularly suited for small engines and which includes compact, sturdy and inexpensive means for enabling sutstantially atmospheric pressure to be maintained in the interior of the fuel tank of the system while nevertheless preventing emission of unburned fuel vapors into the atmosphere.

Those skilled in the art will appreciate that the invention can be embodied in forms other than as herein disclosed for purposes of illustration.

The invention is defined by the following claims:

I claim:

1. In a fuel system for a cyclically operating internal combustion engine that has a crankcase in which there is a subatmospheric pressure during at least a portion of each engine cycle when the engine is operating, and which system comprises a tank that holds a liquid fuel supply for the engine and wherein a substantially constant atmospheric pressure is to be maintained:

A. an imperforate removable closure for an opening in the tank through which fuel is filled thereinto, said closure, when in place, providing a substantially vapor-proof seal for the tank;

B. means defining a suction chamber which is at all times communicated with the interior of the crankcase and which is communicable with the atmosphere through a breather passage;

C. a check valve in said breather passage arranged to normally close the same but to open when pressure in the suction chamber exceeds atmospheric pressure;

D. means defining a fuel tank pressure relief passage communicated at one end with the interior of the fuel tank and communicated at its other end with the interior of the crankcase;

E. pressure responsive outlet valve means operatively associated with said pressure relief passage, comprising a movable element having opposite surfaces that are respectively exposed to the atmosphere and to the interior of the tank, at the top thereof, said outlet valve means being normally closed to prevent flow through said pressure relief passage but being arranged to be opened by pressure in the tank that exceeds atmospheric pressure;

F. means defining a fuel tank suction relief passage communicated at one end with the interior of the tank and communicated at its other end with the atmosphere; and G. pressure responsive valve means operatively associated with said suction relief passage, comprising a movable element having opposite surfaces that are respectively exposed to the interior of the tank, at the top thereof, and to the interior of the suction chamber, said inlet valve means being normally closed to prevent flow through said suction relief passage but being arranged to be opened by subatmospheric pressure in said suction chamber.

2. The fuel system of claim 1, further characterized by:

H. a carburetor for the engine, comprising a carburetor body;

I. said suction chamber being in the carburetor body; and

J. said breather passage comprising an air induction passage in the carburetor body through which combustion air is drawn into the engine.

3. In combination with a cyclically operating internal combustion engine that has a crankcase in which a subatmospheric crankcase pressure obtains during at least a portion of each engine cycle and has a carburetor with a body wherein there is an air induction passage through which combustion air is drawn into the engine, a liquid fuel system for the engine in which a supply of fuel is maintained under substantially atmospheric pressure but from which substantially no unburned fuel vapors are vented to the atmosphere, said fuel system being characterized by:

A. means defining a tank for liquid fuel having
   (1) a filler opening through which fuel can be filled into the tank,
   (2) a pressure relief outlet, and
   (3) a suction relief inlet;

B. an imperforate removable closure for said filler opening;

C. means for communicating the interior of the crankcase with the air induction passage through a valve seat;

D. a check valve cooperating with said valve seat to prevent flow in the direction from the air induction passage to the crankcase but arranged to permit flow in the opposite direction;

E. means defining a pressure relief passage for communicating said pressure relief outlet with the interior of the crankcase;

F. pressure responsive valve means normally closing said pressure relief passage and comprising a pressure responsive valve element having opposite surfaces that are respectively subjected to atmospheric pressure and to pressure in the interior of the tank, said valve element being arranged to open the pressure relief passage when pressure in the tank exceeds atmospheric pressure;

G. means defining a suction relief passage for communicating said suction relief inlet with atmospheric air; and H. other pressure responsive valve means normally closing said suction relief passage and comprising a second pressure responsive valve element having opposite surfaces that are respectively subjected to atmospheric pressure and to crankcase pressure, said second pressure responsive valve element being arranged to open the suction relief passage when atmospheric pressure exceeds crankcase pressure.

4. The combination of claim 3, further characterized by:

I. said valve seat being in the carburetor body;

J. the carburetor body defining a suction chamber which is at all times communicated with the interior of the crankcase and which is communicated with the air induction passage through the valve seat; and K. said other pressure responsive valve means comprising a diaphragm which closes one side of the suction chamber and thus has one of its surfaces subjected to crankcase pressure as manifested in the suction chamber.

5. The combination of claim 4 wherein said air induction passage has an air filter at its inlet and wherein said means defining a suction relief passage comprises a passage in the carburetor body that opens to the air induction passage.

6. The combination of claim 3, further characterized by:

I. partition means in the fuel tank, extending downwardly through a major portion of the height of the fuel tank from the top thereof and dividing the interior of the fuel tank into
   (1) a larger compartment into which said filler opening opens directly, and
   (2) a smaller compartment which is communicated with the larger compartment only through
      (a) restricted vent means at the top of the partition means, through which gas pressures in said compartments are equalized, and
      (b) restricted port means near the bottom of said partition means, through which fuel can enter said smaller compartment from said larger compartment at a rate substantially slower than that at which it can be filled into the tank through the filler opening,
   so that filling of fuel into the tank will normally be terminated when the larger compartment is filled but the smaller compartment remains partly empty, and subsequent flow of fuel into the smaller compartment from the larger one will bring fuel in the larger compartment to a level such that fuel cannot be forced out of the filler opening by engine vibration or the like.

7. A liquid fuel system for a small cyclically operating internal combustion engine that has a crankcase in which there is a subatmospheric pressure during at least a portion of each engine cycle, said liquid fuel system being of the type comprising a fuel tank having a top wall in which there is a filler opening, a carburetor body overlying the fuel tank top wall and wherein there is an induction air passage into which air is drawn through a filter and from which the air flows to the engine for combustion, and a resiliently flexible membrane confined between opposing surfaces on the underside of the carburetor body and on the top wall of the fuel tank, said fuel system being characterized by:

A. the top wall of the fuel tank being formed with a substantially deep depression that is spaced from the filler opening and extends down to near the bottom of the tank to define a buffer chamber in the tank interior,
  (1) said buffer chamber being closed at its top by a portion of said membrane that comprises a first diaphragm, and
  (2) the interior of the buffer chamber being communicated with the remainder of the tank interior only through
    (a) restricted port means at the bottom of the buffer chamber through which fuel enters the buffer chamber substantially more slowly than it can be filled into the tank through the filler opening, thus frustrating filling of the tank to a level at which fuel can be easily expelled therefrom through the filler opening, and
    (b) restricted vent means downwardly adjacent to the membrane by which pressure in the buffer chamber is equalized with that in the remainder of the tank interior;
B. the carburetor body having means defining
  (1) a nipple,
  (2) a breather passage that opens at one end through said nipple and opens at its other end to the induction air passage, and
  (3) a check valve seat in said breather passage, so located that a portion of the breather passage extends between its said one end and the check valve seat;
C. a duct communicated at one end with the interior of the crankcase and connected at its other end with said nipple, to constantly maintain crankcase pressure in said portion of the breather passage;
D. a check valve element cooperating with said check valve seat to normally prevent communication between the induction air passage and said portion of the breather passage but arranged to be opened by crankcase pressures that exceed pressure in the induction air passage;
E. the carburetor body further having a first tank vent passage which communicates with said portion of the breather passage and opens to the underside of the carburetor body at a hole in the membrane that is spaced from said first diaphragm;
F. the top wall of the fuel tank having a first groove in its upper surface that
  (1) has one end portion spaced a small distance from the top of the buffer chamber and
  (2) extends from its said end portion to said hole in the membrane;
G. the underside of the carburetor having a first well therein which defines a pressure chamber and which
  (1) is communicated with the atmosphere,
  (2) opens downwardly over the buffer chamber and said one end portion of said first groove, and
  (3) is closed at its bottom by said first diaphragm, which normally cooperates with a tank top wall upper surface portion that is between the buffer chamber and said first groove to prevent communication between the tank interior and said first groove, but which rises away from said surface portion, to permit such communication, in response to pressures in the tank interior that exceed atmospheric pressure;
H. the carburetor body further having a second tank vent passage which communicates with the induction air passage and opens to the underside of the carburetor body at another hole in said membrane that is spaced from the first mentioned hole therein and from said first diaphragm;
I. the top wall of the fuel tank further having
  (1) a vent hole therethrough which is spaced from the buffer chamber and from said first groove, and
  (2) a second groove in its upper surface, spaced from the buffer chamber and said first groove, said second groove having one end spaced a small distance from said vent hole and its other end portion communicated with the second tank vent passage through said other hole in the membrane; and
J. the underside of the carburetor body also having a second well therein which defines a suction chamber and which
  (1) is communicated with said portion of the breather passage,
  (2) opens downwardly towards the portion of the top wall of the tank that has said vent hole and said second groove therein, and
  (3) is closed at its bottom by a portion of the membrane that provides a second diaphragm which normally cooperates with an area of the tank top wall upper surface to prevent communication between said vent hole and said second groove but rises away from that surface area to permit such communication when pressure in the suction chamber is substantially lower than pressure in the interior of the tank.

8. The liquid fuel system of claim 7, further characterized by:

K. a spring reacting between the upper end of said pressure chamber and said first diaphragm to yieldingly bias the first diaphragm downwardly into engagement with said upper surface portion of the tank top wall; and
L. another spring reacting between the top of said suction chamber and said second diaphragm to yieldingly bias the second diaphragm downwardly into engagement with said area of the tank top wall upper surface.

9. A liquid fuel system for a cyclically operating internal combustion engine that has a crankcase in which there is a subatmospheric pressure during at least a portion of each engine cycle, and which fuel system comprises a tank that holds a supply of liquid fuel for the engine, a carburetor having an induction air passage through which combustion air flows to be mixed with fuel and drawn into the engine, and means for admitting atmospheric air to the tank to replace fuel withdrawn from the tank, said fuel system being characterized by means for relieving above-atmospheric pressure in the tank to maintain a substantially atmospheric pressure therein but for preventing the emission of unburned fuel vapors from the interior of the tank into the atmosphere, the last mentioned means comprising:

A. means defining an expansion chamber which is
  (1) at all times connunicated with the interior of the crankcase,
  (2) communicable with the induction air passage through a check valve seat, and
  (3) communicable with the interior of the tank;
B. a check valve cooperating with said check valve seat to normally prevent communication therethrough but arranged to open when pressure in said expansion chamber exceeds pressure in the induction air passage; and
C. normally closed valve means responsive to differences between atmospheric pressure and pressure in the interior of the tank, said normally closed valve means being arranged
  (1) to normally prevent communication between the interior of the tank and said expansion chamber, but
  (2) to open and permit such communication when pressure in the interior of the tank exceeds atmospheric pressure.

* * * * *